United States Patent
Messina

[11] Patent Number: 5,416,319
[45] Date of Patent: May 16, 1995

[54] OPTICAL SCANNER WITH DUAL ROTATING WEDGE MIRRORS

[75] Inventor: Peter V. Messina, Santa Monica, Calif.

[73] Assignee: Hughes Aircraft Company, Los Angeles, Calif.

[21] Appl. No.: 161,383

[22] Filed: Dec. 3, 1993

[51] Int. Cl.⁶ .................................................. H01J 3/14
[52] U.S. Cl. ..................................... 250/235; 359/220
[58] Field of Search ............... 250/236, 235, 347, 348, 250/203.6; 359/220, 221, 212

[56] References Cited

U.S. PATENT DOCUMENTS

| | | | |
|---|---|---|---|
| 2,895,049 | 6/1957 | Astheimer et al. | 250/65 |
| 3,023,662 | 8/1958 | Hicks, Jr. | 88/1 |
| 3,156,823 | 5/1962 | Astheimer et al. | 250/83.3 |
| 3,782,835 | 1/1974 | Abel | 356/216 |
| 4,030,807 | 6/1977 | Birney | 350/7 |
| 4,039,246 | 8/1977 | Voigt | 350/7 |
| 5,262,630 | 11/1993 | Kordulla | 250/203.6 |

Primary Examiner—David C. Nelms
Assistant Examiner—Steven L. Nichols
Attorney, Agent, or Firm—Hugh P. Gortler; Michael W. Sales; W. K. Denson-Low

[57] ABSTRACT

An optical scanning system (20, 20A-F), suitable for scanning a beam (26, 26A) emanating from a source (68) of light or for directing a beam towards a detector (62) of light, employs two independently rotatable wedge-shaped mirrors (M1, M2) wherein a reflecting surface (54, 58) of each wedge mirror is inclined relative to a central axis (38) of the scanner. A main one of the wedge mirrors (M1) is centrally located about the central axis and an auxiliary one of the wedge mirrors (M2) is located on the central axis facing the main wedge mirror in one embodiment of the invention, and is displaced from the central axis in a second embodiment of the invention. A beam of light propagating between the source or detector to the auxiliary wedge mirror may pass either through a central bore (28) of the main wedge mirror in the first embodiment of the invention, or via a bypass (112) of relay mirrors around the main wedge mirror in the second embodiment of the invention. The beam to be scanned is reflected between the two wedge mirrors with the relative orientations of the wedge mirrors, in terms of their respective angles (B1, B2) of rotation about the central axis, determine the orientation of the scanned beam. The position of the main wedge mirror relative to the bypass path may be altered along the central axis by displacement means (156, 158) for minimization of a window (96) through which a scanned beam propagates.

14 Claims, 5 Drawing Sheets

OPTICAL SCANNER WITH DUAL ROTATING WEDGE MIRRORS

BACKGROUND OF THE INVENTION

This invention relates to an optical scanner directing a scanned beam through a window into a field of view and, more particularly, to an optical scanner employing two wedge mirrors independently rotatable about an optical axis to provide a desired configuration of scan.

Various forms of optical scanning systems have been employed for scanning a beam of light for illuminating a subject with light produced by a source of light or for detecting light emitted or reflected from the subject to a detector. The term "light" as used herein is to be understood to include visible radiation as well as radiation falling on other portions of the electromagnetic spectrum such as infrared radiation and ultraviolet radiation. Such scanning systems may employ a variety of mirrors and/or other optical elements such as lenses and prisms for producing a raster scan or a spiral scan, by way of example. Scanning is accomplished by movement of mirrors and/or other ones of the optical elements, typically by a pivoting or rotation of the optical elements. For example, in prior art raster mirror scanning, such a scanner might include bidirectional rotation of gimballed flat mirrors. Alternatively, such scanning systems may comprise either single or dual axes, continuous rotation polygons with tilted mirror facets, and single axes wedge mirror rotation in which platform motion, typically in airborne and in space applications, provides the orthogonal axis scanning motion.

A problem exists in that the previously available scanners were overly complex in terms of the mechanisms required to move the various optical elements. Refractive optical elements in the scanner have limited a field of regard (FOR) of the scanner to a circular cone with a half-cone angle less than approximately 70 degrees, and have introduced other disadvantages such as chromatic aberration and image field distortion as a function of beam pointing angle. Where refractive wedge shaped optical elements have been employed in a scanner, the line of sight (LOS) pointing angle was a non-linear function of wedge angle, as well as a non-linear function of radiation wavelength, index of refraction of the optical material, and angle of incidence. Also, the LOS pointing angle has been sensitive to changes in the index of refraction of the material of the refractive optical elements. To achieve a minimum exit window size for an internally mounted two axis gimballed scanning sensor looking through a flush mounted, conformal window, the whole gimballed sensor must be translated or tilted in two axes.

SUMMARY OF THE INVENTION

The aforementioned problem is overcome and other advantages are provided by an optical scanner which, in accordance with the invention, employs two independently rotatable wedge mirrors. A beam of light is reflected between the two mirrors to attain a desired orientation in space based on the magnitude of the wedge angles of the two mirrors and upon the orientation of the reflecting surfaces of the mirrors about their respective axes of rotation. In the preferred embodiments of the invention, the axis of rotation of a primary or main one of the rotatable wedge mirrors coincides with the axis of rotation of a secondary or auxiliary one of the rotatable wedge mirrors. The angles of inclination of the reflecting surfaces of the respective wedge mirrors to the common axis of rotation may differ, if desired. However, in the preferred embodiments of the invention, it has been found to be advantageous to use equal angles of inclination of the reflecting surfaces of the wedge mirrors relative to the common axis of rotation. An optical path including relay mirrors may be employed with the auxiliary wedge mirror in which case the orientation of the reflecting surface of the auxiliary wedge mirror may be altered to compensate for a folding of optical path by the relay optics.

In accordance with a feature of the invention, use of relay optics for communication of a beam of light between a source, or a detector, and the auxiliary wedge mirror may provide for the inclusion of an optical power by use of curved mirror surfaces or by use of lenses in the relay optics. The use of relay optics provides for a bypass of the beam around the main wedge mirror for communicating the beam between the source, or detector, and the auxiliary wedge mirror. The use of the relay optics also permits a displacement of the main wedge mirror along a central optical axis of the sensor to adjust he position of the main wedge mirror relative to that of the auxiliary wedge mirror for further control of the position and orientation of a scanned beam emanating from or received by the scanner.

The use of a window in the scanner requires the selection of a size to the window which is large enough to accommodate the largest cone angle of the scan. However, in accordance with a feature of the invention, the displacement of the main wedge mirror along the central axis allows for minimization of the window size. In the absence of the bypass path, a central bore may be located within the main wedge mirror for communication of light between the source, or detector, and the auxiliary wedge mirror. In accordance with the invention, each of the wedge mirrors can be rotated independently about a common rotational axis for direction of the scanned beam in any desired direction of orientation relative to the scanner.

The actual region of space which is scanned may be equal to or less than that of the maximum conical region of space which can be scanned by the scanner. In the latter case, wherein a smaller region of space is scanned, the scanned region may be centered on the central scanner axis, or may be offset from the central axis scanner. The maximum scanned region is limited by the bounds of a conical field of regard, the conical field being equal to twice the sum of the wedge angles of the main and the auxiliary wedge mirrors.

BRIEF DESCRIPTION OF THE DRAWING

The aforementioned aspects and other features of the invention are explained in the following description, taken in connection with the accompanying drawing wherein.

DETAILED DESCRIPTION

Figure 1:
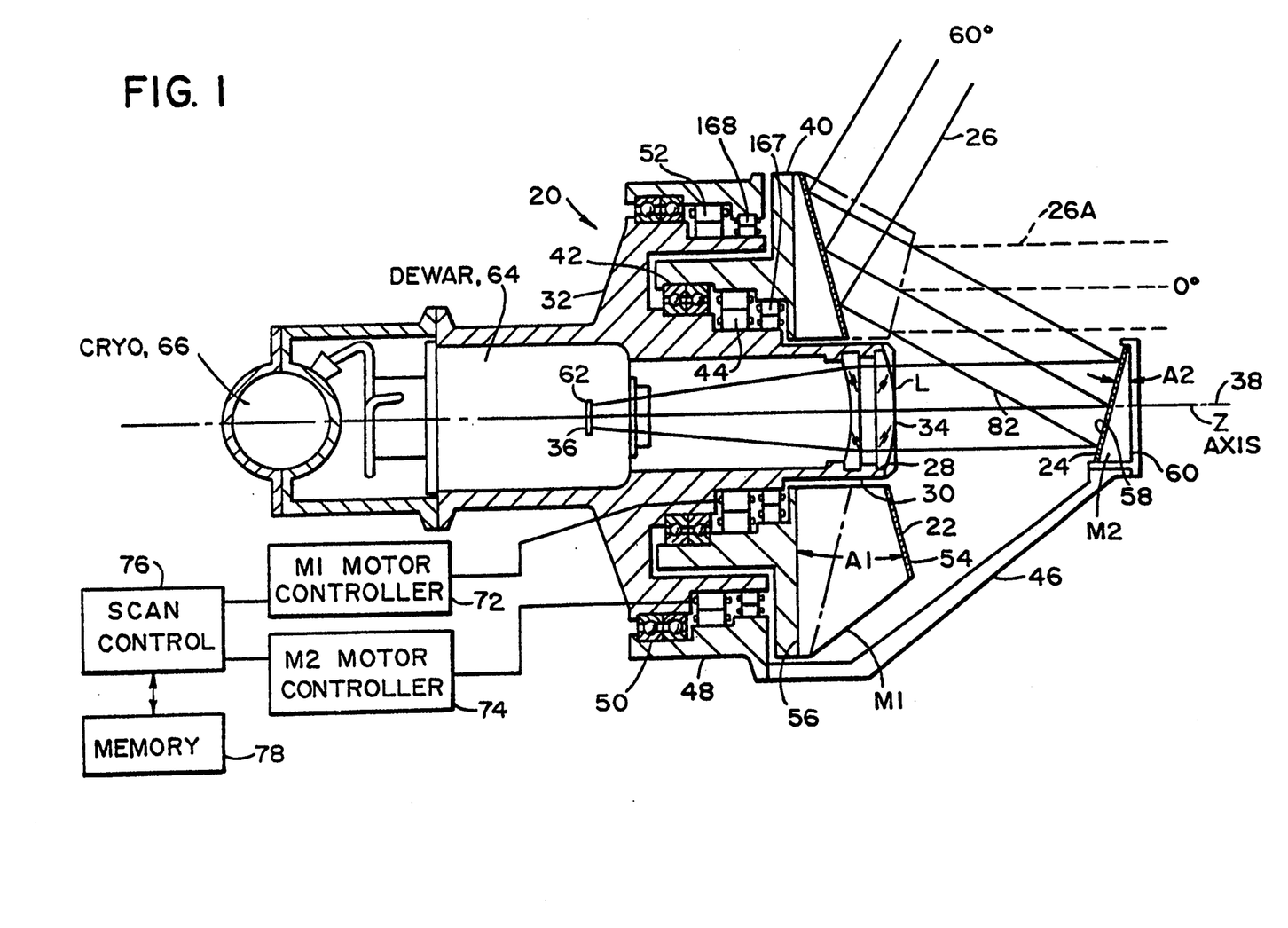
FIG. 1 is a longitudinal sectional view of an infrared detector in combination with an optical scanner including two rotatable wedge mirrors in accordance with a first embodiment of the invention.

FIG. 1 shows a scanner 20 comprising a primary wedge-shaped mirror 22 and a secondary wedge-shaped mirror 24 for scanning a beam 26 in accordance with a first embodiment of the invention. The mirror 22 has an annular shape with a central bore 28 which encircles a cylindrical nose portion 30 of a housing 32. In the case of reception of optical energy by the scanner 20, optical energy of the beam 26 propagates towards the primary mirror 22 is reflected by the primary mirror 22 to the secondary mirror 24, and is reflected by the secondary mirror 24 through a lens 34 to a fixed point 36 disposed within the housing 32 on a central longitudinal axis 38 of the scanner 20. The propagation of optical energy, or light, along the beam 26 with subsequent reflections via the mirrors 22 and 24 to the fixed point 36 constitutes an optical path wherein the leg of the path between the mirror 24 and the fixed point 36 is stationary while the remaining portions of the optical path are scanned in accordance with rotation of the mirror 22 and 24 about the axis 38. The lens 34 is supported within the nose portion 30 of the housing 32.

The primary mirror 22 is supported by a mount 40 which encircles the nose portion 30 and is rotatably secured thereto by bearings 42, and is made to rotate about the axis 38 by an electric motor 44 and an angular position sensor 167 disposed between the mount 40 and the nose portion 30. The secondary mirror 24 is supported by a frame element 46 extending in the manner of an arm from a ring 48 which encircles the housing 32. The ring 48 is rotatably mounted to the housing 32 by bearings 50 and is made to rotate about the housing 32 and the axis 38 by a motor 52 and an angular position sensor 168 disposed between the ring 48 and the housing 32.

Thus, the motor 44 imparts rotation to the primary mirror 22 about its axis, and the motor 52 imparts rotation to the secondary mirror 24 about its axis. In the general case in the practice of the invention, the rotational axes of the mirrors 22 and 24 may be inclined relative to each other, or displaced relative to each other, or may coincide. In the preferred embodiment of the invention, the rotational axes of the mirrors 22 and 24 coincide to provide a uniform pattern of scanning of the beam 26. Any offset or inclination between the two rotational axes of the lens 22 and 24 would introduce a distortion to the scanning pattern, which distortion may be useful for viewing certain types of subject matter. The primary mirror 22 has a reflecting surface 54 which is inclined relative to a base 56 of the mirror 22 by a wedge angle A1. The secondary mirror 24 has a reflecting surface 58 which is inclined relative to a base 60 of the mirror 24 by a wedge angle A2. In the practice of the invention, in the general case, the wedge angles A1 and A2 may differ; however, in the embodiment of FIG. 1, the wedge angles A1 and A2 are equal. In order to facilitate comparison of primary and secondary mirrors to be employed in various embodiments of the invention, it is convenient to identify further the primary mirror 22 by the legend M1 to indicate that this is the primary or main reflecting wedge mirror, and to identify further the secondary mirror 24 by the legend M2 to indicate that the mirror 24 provides a secondary or auxiliary function in the scanning of the beam 26. FIG. 1 shows the primary mirror 22 in a first position, indicated by solid line construction, resulting in the generation of the beam 26 diverging from the axis 38, and shows the primary mirror 22 in the opposite position indicated in phantom-line construction resulting in a beam 26A directed parallel to the axis 38.

Figures 4, 6:
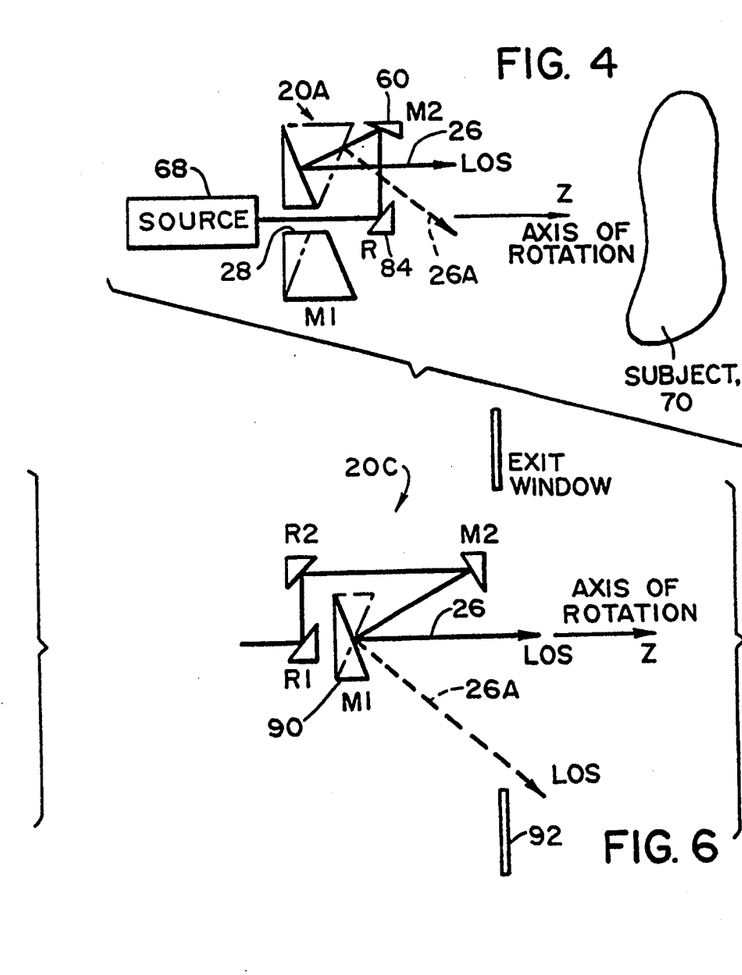
FIG. 4 is a diagrammatic sectional view of the arrangement of rotatable wedge mirrors in accordance with a second embodiment of the invention, one of the wedge mirrors having a central bore for passage of a beam of light to a second wedge mirror via a relay mirror.
FIG. 6 is a view, similar to that of FIG. 5, but with the mirrors repositioned to provide for an on-axis location of the central LOS beam.

To operate the scanner 20 in a mode for receiving incident radiation, such as infrared radiation by way of example, a photosensitive detector 62 is positioned at the fixed point 36 within a cold environment provided by a Dewar 64, the Dewar 64 being cooled by a cryostat 66, both the Dewar and the cryostat being held within the housing 32. Incoming infrared radiation, incident via the beams 26 or 26A, follows the optical path through the lens 34 to be focused by the lens 34 upon the detector 62. Alternatively, if desired, the scanner 20 can be operated in a transmission mode wherein a scanned beam of light is transmitted by the scanner 20 for illuminating a subject. Such a transmission mode of the scanner 20 is indicated in FIG. 4 wherein light from a source 68 is scanned by means of mirrors M1 and M2 to illuminate a subject 70. The source 68 is to be located at the fixed point 36. In either a receiving or a transmitting mode, the motors 44 and 52 of the scanner 20 are to be operated in the same fashion as is illustrated in FIG. 1 wherein the scanner 20 is provided with a controller 72 and a controller 74, respectively, for controlling operation of the motors 44 and 52 for rotation of the primary M1 mirror and the secondary M2 mirror.

A scan controller 76, which may include a computer (not shown) dictates desired rotational positions of the M1 and the M2 mirrors to the controllers 72 and 74 to bring the M1 and the M2 mirrors into their respective rotational positions for directing the beam 26 in a desired direction or orientation relative to the scanner 20. The mirror angular position sensors 167 and 168 provide closed loop feedback control for mirrors M1 and M2 respectively. By way of example in the operation of the scan controller 76, a memory 78 may be employed to store the positional addresses of the M1 and the M2 mirrors for all orientations of the beam 26 within a 60 degree sector of rotation about the axis 38. The scan controller 76 then reads the memory 78 for the desired rotational positions of the M1 and the M2 mirrors which provide a desired orientation of the beam 26 within the foregoing sector. For beam directions in the next sector of 60 degrees, the scan controller 76 simply adds on an additional 60 degrees of rotation to each of the mirrors M1 and M2. Similarly, for orientation of the beam 26 in any of the other ones of the six sectors, the scan control 76 simply adds on an additional amount of rotation, namely, an integral amount of sixty degrees, to point the beam 26 in the desired sector. A raster scan is obtained by sequentially addressing the motor controllers 72 and 74 to rotate the mirrors M1 and M2 to the requisite rotational positions for directing the beam 26 to successive sites along the raster scan path. A similar procedure is provided for generating a spiral scan path, by way of example.

Figure 2:
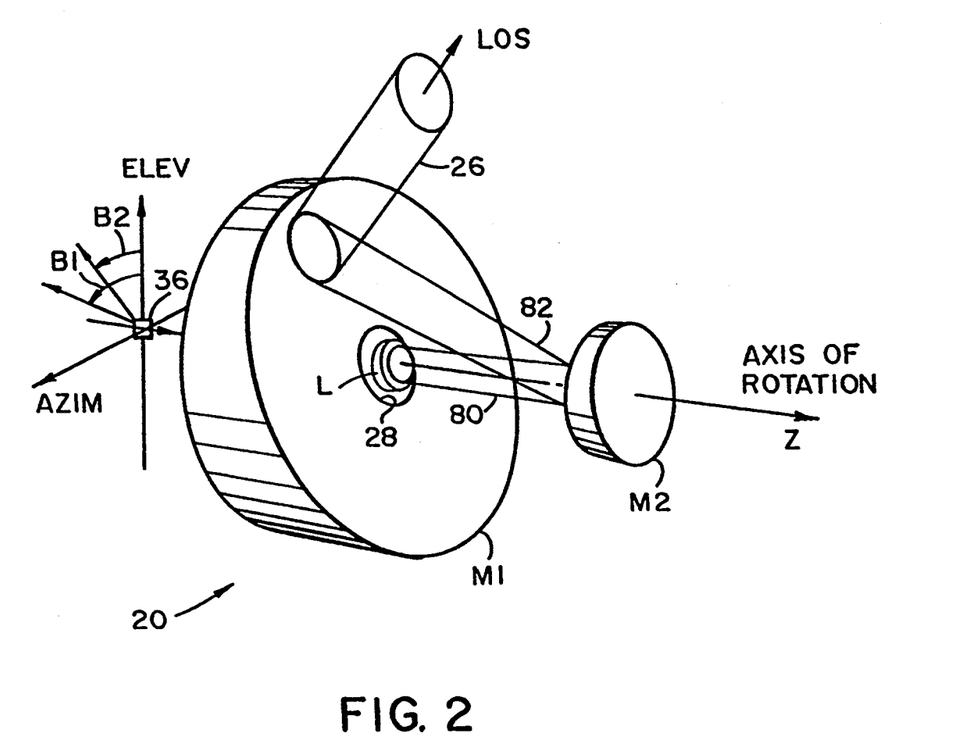
FIG. 2 is a simplified perspective view showing the path of a beam reflected between the two rotatable wedge mirrors of FIG. 1.
Figure 3:
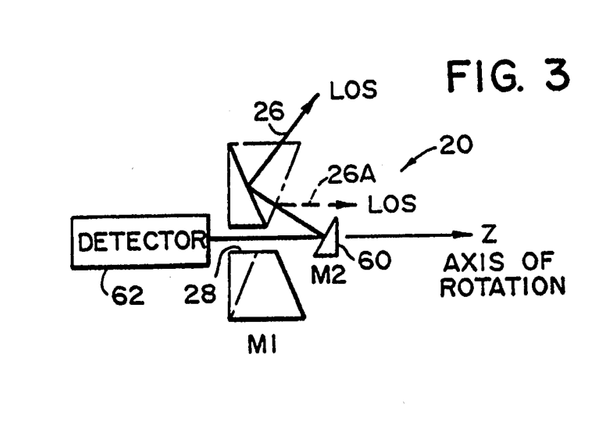
FIG. 3 is a longitudinal sectional view, shown diagrammatically, of the mirror arrangement of FIG. 2, one of the wedge mirrors having a central bore for passage of a beam of light.

FIGS. 2 and 3 are useful in explaining the scanning operation of the scanner 20 of FIG. 1. FIG. 2 includes a coordinate axes system including a Z axis, an elevation axis and an azimuth axis. The Z axis serves as the axis of rotation of the mirrors M1 and M2 , and coincides, in FIG. 1, with the central axis 38. The elevation and azimuth axes are shown intersecting the Z axis at the fixed point 36. A lens L is inserted in the central bore 28 of the M1 mirror, the lens L corresponding to the lens 34 of FIG. 1. The mirror M1 rotates through an angle B1, as shown in the coordinate axes of FIG. 2, and the mirror M2 rotates though an angle B2 as shown in FIG. 2. In the transmission mode of the scanner 20, light emanating from the point 36 is collimated by the lens L on a stationary leg 80 of the optical path, the stationary leg 80 being reflected by the mirror M2 as a swept leg 82 of the optical path, the leg 82 sweeping out a conical surface upon rotation of the mirror M2 about the Z axis.

If the mirror M2 be held in a stationary position, such as that of FIG. 3, and the mirror M1 is rotated, then the beam 26 is swept within a single plane. This is demonstrated in FIG. 3 in which the extreme positions of the swept beam are shown, the beam 26 being shown in a position of maximum divergence from the axis and the beam 26A (shown as a dashed arrow) showing the minimum divergence of the beam from the Z axis. The plane of the scanning of FIG. 3 may be selected by rotation of the mirror M2 to a specific value of rotational angle B2. In this way, the beam 26 may be directed to any desired point within the field of view of the scanner 20 by rotation of the mirrors M1 and M2. In the case of the reception mode of the scanner 20, the foregoing operation of the scanning is identical to that of the transmission mode. However, in the reception mode, the beam 26 represents an incoming beam of light which propagates towards the point 36.

FIG. 4 shows a simplified diagrammatic view of a scanner 20A which is an alternative embodiment to the scanner 20 of FIG. 3. In FIG. 4, the mirror M1 has the same position and configuration as does the mirror M1 of FIG. 3. However, in FIG. 4, the mirror M2 has been displaced away from the Z axis, and an additional relay mirror R is provided to fold the optical path so as to direct rays of light from the source 68 in a direction perpendicular to the Z axis to impinge upon the mirror M2. In FIG. 4, the base 60 of the mirror M2 is parallel to the Z axis while, in FIG. 3, the base 60 of the mirror M2 is perpendicular to the Z axis. Also, in FIG. 4, the mirror M2 is oriented with its wedge angle pointing towards the mirror M1. If desired, in FIG. 4, the wedge angle of the mirror M2 may be the same size as the wedge angle employed in the embodiment of FIG. 3. Thus, assuming the equality of wedge angles of mirrors M1 and M2 in FIG. 4, the beam 26 is directed in a direction parallel to the Z axis and the beam 26A crosses over the Z axis.

Figure 5:
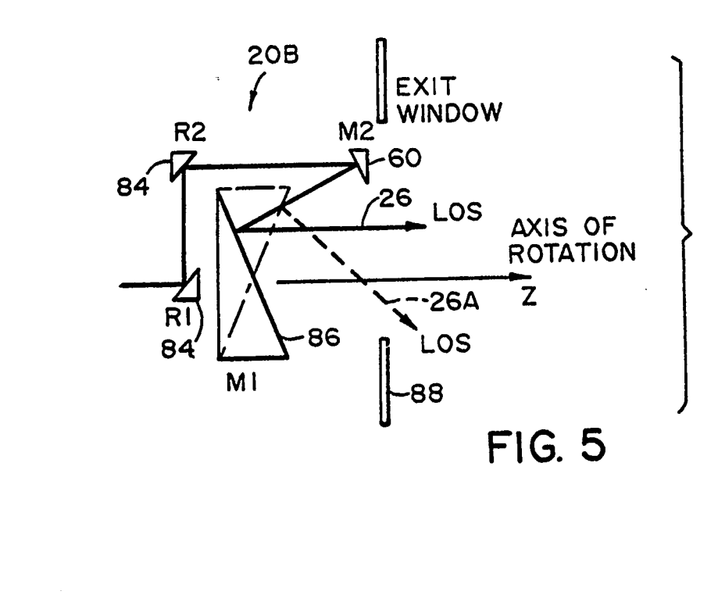
FIG. 5 is a diagrammatic longitudinal sectional view of the arrangement of rotatable wedge mirrors including additional relay mirrors for routing a beam of light about a central one of the wedge mirrors in accordance with a third embodiment resulting in an off-axis displacement of a central line-of-sight (LOS) beam.

FIG. 5 shows a simplified diagrammatic view of a scanner 20B which shows a further modification of the scanner 20A of FIG. 4. In FIG. 5, two relay mirrors 84 are employed, each of the mirrors 84 having the same construction as the relay mirror 84 employed in FIG. 4. In FIG. 5, the relay mirrors are further identified by the legends R1 and R2, and each of the relay mirrors R1 and R2 serve to fold the optical path by 90 degrees. Thus, with respect to an outgoing beam of radiation, the mirror R1 serves to direct light in a direction perpendicular to the Z axis, and the mirror R2 redirects the light in a direction parallel to the Z axis so as to impinge upon the reflecting surface of the mirror M2. The mirror M2 may be configured with the same wedge angle as has been employed in FIG. 3, and is oriented in FIG. 5 with the mirror base 60 perpendicular to the Z axis, and with the wedge angle pointing towards the Z axis. In FIG. 5, the mirror M2 is offset at a sufficient distance from the Z axis so as to allow the portion of the optical path between the mirrors R2 and M2 to bypass the mirror M1. Therefore, in the scanner 20B of FIG. 5, there is no longer a passage of the optical path through the mirror M1, and the central bore 28 (FIG. 3) can be deleted so as to provide for a wedge mirror 86 of solid construction to serve the function of the M1 mirror. The orientation of the beams 26 and 26A of FIG. 5 is the same as that shown in FIG. 4. Also, in Fig, 5, an exit window 88 is provided to the right side of the mirror M2. The window 88 is sufficiently large so as to enable the beam 26 in all of its scanned orientations to enter the scanner 20B during a receiving mode of operation and to exit the scanner 20B during a transmitting mode of operation.

FIG. 6 shows a scanner 20C which is a modification of the scanner 20B of FIG. 5. In FIG. 5, it is noted that the leg of the optical path between the mirrors R2 and M2 is drawn slightly longer than that of the leg of the optical path between the mirrors R1 and R2. However, in FIG. 6, the leg of the optical path between the mirrors R2 and M2 has been lengthened to be substantially longer than the leg of the optical path between the mirrors R1 and R2. This permits use, in FIG. 6, of a wedge mirror 90 which has the same configuration as the wedge mirror 86 of FIG. 5, but is substantially smaller than the wedge mirror 86. This permits an overall configuration to the optical portion of the scanner 20C which is significantly smaller than that of the scanner 20B while retaining the capacity to scan the same region of space as does the scanner 20B. The scanner 20C includes an exit window 92 having a size to match the maximum scanned angle.

Figure 7:
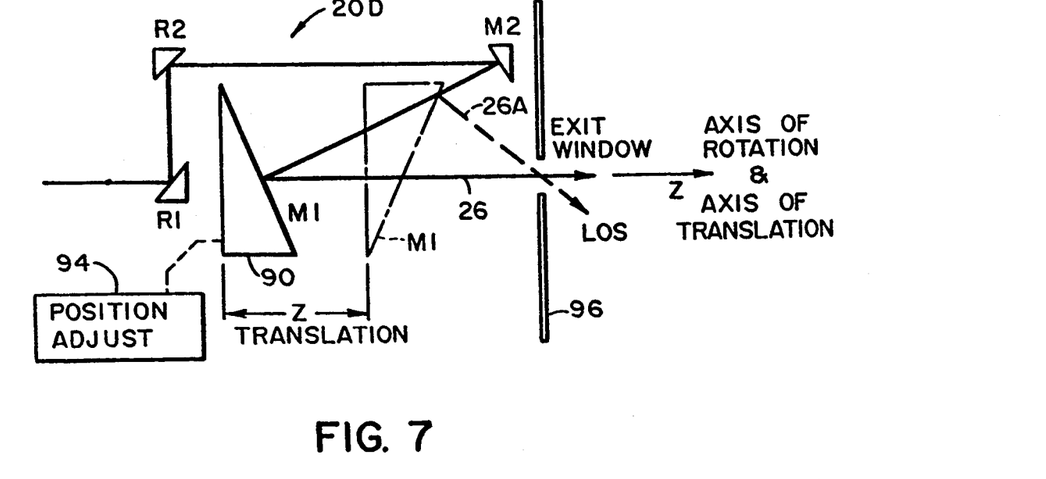
FIG. 7 is a view, similar to that of FIGS. 5 and 6, but showing also a displacement of the central wedge mirror along a longitudinal axis of the optical assembly between the extreme positions of the central wedge mirror of FIGS. 5 and 6 to provide an additional feature of the invention in which the diverging paths of a scanned beam are positioned for minimizing the required aperture of an exit window.

FIG. 7 shows a scanner 20D which is a modification of the scanner 20C of FIG. 6, the modification being the inclusion of a positioning unit 94 which adjusts the position of the mirror 90 along the Z axis . Thus, the M1 mirror 90 can be located distant from the mirror M2, as shown by the construction of the mirror M1 with solid lines, or may be positioned near to the mirror M2 as is shown by the construction of the mirror M1 in phantom view. The scanner 20D includes an exit window 96 of appropriate size for handling the maximum angle of scan of the diverging beam 26.

Upon comparing the location of the beams 26 and 26A of FIGS. 5 and 6, it is noted that rays of light from the mirror M2 impinge upon the mirror M1 at locations above the Z axis, while, in FIG. 6, the rays of light from the mirror M2 impinge upon a central region of the mirror M1 in the vicinity of the Z axis. This results in different locations of the beams 26 and 26A in FIGS. 5 and 6. With respect to the scanner 20D of FIG. 7, the point of impingement of the rays of light from the mirror M2 upon the mirror M1 is related directly to the location of the mirror M1 upon the Z axis. This allows beams of various directions to cross through the window 96 at a central location of the window 96, thereby to minimize the required size of the window 96.

For example, the beam 26A, in FIG. 7, is shown propagating through the central portion of the window 96 upon reflection from an upper portion of the mirror M1, and the location of the mirror M1 is near the mirror M2. This is similar to the portrayal of the beam 26A in FIG. 5 wherein the beam passes through the window 88 at a point near to the Z axis. However, in contrast, the beam 26 of FIG. 7 also passes through the window 96 at a location substantially coincident with the Z axis while, in FIG. 5, the beam 26 is displaced substantially from the Z axis. In FIG. 7, the mirror M1 has been positioned at a location distant from the mirror M2 during the generation of the beam 26 to provide for the locating of the beam 26 in substantial coincidence with the Z axis. Thereby, the system 20D of FIG. 7 provides the additional inventive features of variation of the maximum scan angle, as well as reduction in the required size of the exit window without any alteration in the orientations of the mirrors and without changing the wedge angles of the mirrors M1 and M2.

Figure 8:
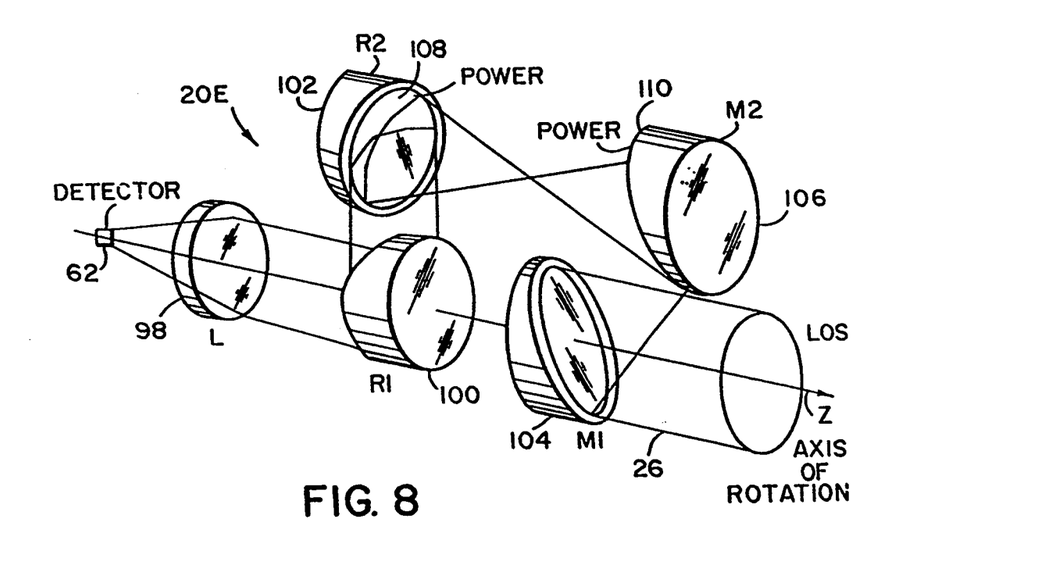
FIG. 8 is a stylized perspective view of the mirror arrangement of FIG. 5, useful in explaining operation of the optical arrangements of FIGS. 5 and 6.

FIG. 8 shows, diagrammatically, a simplified view of a scanner 20E which has an arrangement of optical elements similar to that of FIGS. 5–7, but differs from the embodiments of FIGS. 5–7 in that two of the optical elements, namely the relay mirror R2 and the wedge mirror M2 have curved surfaces to provide optical power to focus a beam of light reflected by these mirrors. The scanner 20E comprises a lens 98 which is further identified as L, a first relay mirror 100 which is further identified as R1, a second relay mirror 102 which is further identified as R2, a primary wedge mirror 104 which is further identified as M1, and a secondary wedge mirror 106 which is further identified as M2. The relay mirror 102 is provided with a curved reflecting surface 108 and the secondary wedge mirror 106 is provided with a curved reflecting surface 110. The optical elements L, R1, and M1 are located along the Z axis coaxial with the detector 62. The mirrors R2 and M2 are offset from the Z axis. The lens L is located between the detector 62 and mirror R1 and functions to collimate the rays of radiation in the same fashion as the lens L in FIG. 1. The mirrors R1, R2, M1 and M2 provide the same functions as the correspondingly identified mirrors in FIGS. 5–7. In addition, the mirrors R2 and M2 provide the aforementioned additional function of focusing the beam of radiation 26 received from the subject 70 (not shown in Fig. 8 but shown in FIG. 4).

The configuration of the optical elements of the scanner 20E can be used also in the transmission mode in which case the detector 62 is replaced with the source 68 (shown in FIG. 4) such that collimated rays of light provided by the lens L are focused into a narrow beam 26 by the mirrors R2 and M2 during a scanning of the beam 26 by the mirrors M1 and M2. It is noted furthermore that, if desired, the first relay mirror R1 may be provided with a curved reflecting surface and the mirror M2 constructed with a planar reflecting surface in which case the relay mirrors R1 and R2 would provide the optical power for focusing the beam 26 for illuminating the subject during a transmission mode of the scanner 20E and for focusing the light of the beam 26 during a receiving mode to impinge upon the detector 62. It is noted by way of further example that, if desired, the optical power of the relay mirrors R1 and R2 can be employed to provide the beam 26 with a diverging form such as may be useful for illuminating the subject 70.

Figure 9:
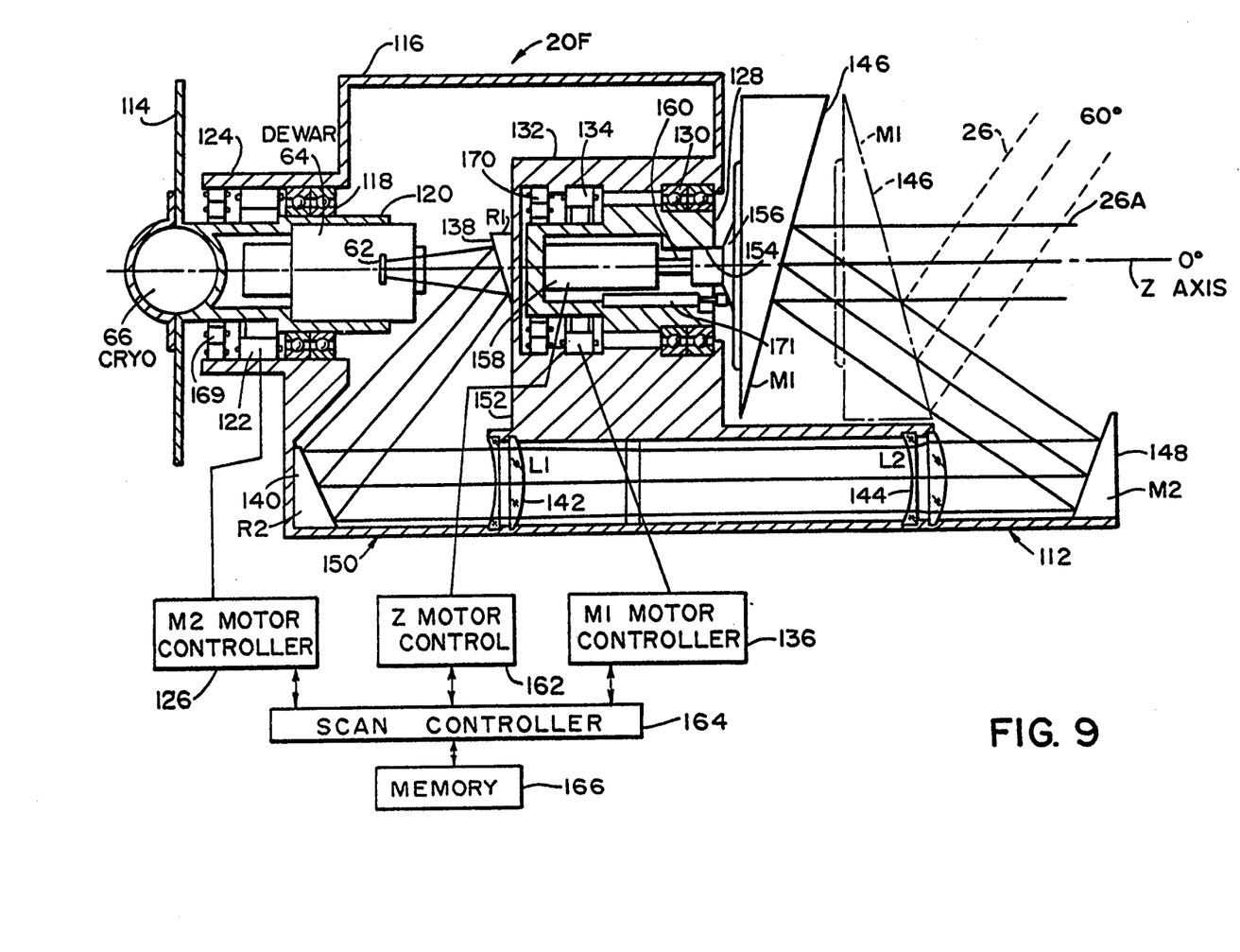
FIG. 9 is a view, similar to that of FIG. 1, but with the optical system modified to provide a relay path around the central wedge mirror, in accordance with the teachings of FIGS. 5–8, FIG. 9 showing also the location of lenses in a bypass path for providing optical power, and showing also the location of a mechanism for translating and rotating the central wedge mirror.

FIG. 9 shows a scanner 20F which is similar to the scanners 20D and 20E of FIGS. 7 and 8 in that the scanner 20F of FIG. 9 provides for adjustment of the Z-axis position of the primary wedge mirror M1 and also provides optical power for focusing the beam 26. However, unlike the scanner 20E of FIG. 8 wherein the optical power is provided by curved optical surfaces on the mirrors R2 and M2, in the scanner 20F of FIG. 9 the optical power is attained by introduction of further optical elements, namely, lenses L1 an L2 disposed in the bypass portion 112 of the optical path between the mirrors R2 and M2.

The scanner 20F comprises a base 114 for supporting the Dewar 64 with its detector 62, and the cryostat 66, the operation of the detector 62, the Dewar 64, and the cryostat 66 having been described above with reference to FIG. 1. The scanner 20F further comprises a housing 116 secured by bearings 118 to a tubular extension 120 of the base 114 to enable rotation of the housing 116 about the tubular extension 120 and about the Z axis which serves as a central longitudinal axis of the scanner 20F. An electric motor 122 and an angular position sensor 169 are disposed between a neck 124 of the housing 116 and the extension 120 of the base 114 to impart rotation of the housing 116 relative to the base 114. A motor controller 126, operative in a manner similar to that of the controller 74 of FIG. 1, provides electrical drive signals for energizing the motor 122. The forward end of the housing 116 carries a turntable 128 which supports the M1 mirror. The turntable 128 is secured by bearings 130 to a central recess 132 of the housing 116 for rotation relative to the housing 116. A motor 134 and angular position sensor 170 are disposed between the cylindrical sidewall of the recess 132 and the turntable 128 for imparting rotation of the turntable 128 relative to the housing 116. A motor controller 136, operative in a manner similar to that of the controller 72 of FIG. 1 applies electric signals to the motor 134 for driving the motor 134.

The scanner 20F further comprises the following optical elements, namely, a mirror 138 which serves as the R1 relay mirror, a mirror 140 which serves as the R2 relay mirror, two lenses 142 and 144 of positive refracting power which are further identified as lenses L1 and L2, respectively, a wedge mirror 146 which serves as the M1 mirror and a wedge mirror 148 which serves as the M2 mirror. By way of comparison with the optical systems of FIGS. 5–7 wherein the relay mirrors R1 and R2 fold the optical path at angles of 90 degrees, the relay mirrors R1 and R2 of FIG. 9 fold the optical path at angles of approximately 45 degrees. The angle of folding is a matter of convenience in the design of the physical configuration of each of the various embodiments of the scanner 20. Thus, in FIG. 9, the relay mirrors R1 and R2 have configurations which are similar to the configurations of the wedge mirrors M1 and M2. The lenses L1 and L2 are disposed between the mirrors R2 and M2 and, due to the optical power of the lenses L1 and L2, the reflecting surfaces of the mirrors R1, R2, and M2 may be made planar, if desired.

The housing 116 further comprises a side chamber 150 disposed parallel to the Z axis and offset from the Z axis to provide the function of supporting each of the optical elements R2, L1, L2, and M2 in their respective positions within the bypass portion 112 of the optical path. As noted above with reference to the description of FIG. 5, the bypass portion serves to direct rays of light around the mirror M1, instead of through the mirror M1 as has been disclosed in the embodiments of FIGS. 1-4. The mirror R1 is supported on a back wall 152 of the recess 132, the mirror R1 being located on the Z axis, and being positioned in view of the relay mirror R2. The turntable 128 comprises a central cylinder 154 coaxial to the Z axis, and a piston 156 translatable along the Z axis within the cylinder 154. The piston 156 carries the mirror M1 for positioning the mirror M1 along the Z axis. The piston 156 is driven by a motorized linear drive 158 disposed within a central cavity of the turntable 128 and connecting with the piston 156 by a rod 160. A motor of the motorized drive 158 is controlled by a controller 162 which provides electric drive signals to the motor for activating the drive 158 to displace the M1 mirror along the Z axis and measured with a linear position sensor 171 for closed loop linear position control.

Also shown in FIG. 9 is a scan controller 164 connected to the motor controllers 126, 136, and 162, and a memory 166 connected to the scan controller 164. The scan controller 164 and the memory 166 operate in a manner similar to that of the scan controller 76 and the memory 78 of FIG. 1 for directing the motors 134 and 122 to rotate, respectively, the M1 and the M2 mirrors. The mirrors M1 and M2 are rotated to the requisite rotational positions about the Z axis for orienting the beam 26 in the direction of a specific site on the subject 70 (shown in FIG. 4). In addition, a scan controller 164 directs the Z-axis motorized drive 158 to position the M1 mirror along the Z axis, as shown also in FIG. 7, for placement of the beam 26 or 26A within an exit window (not shown in FIG. 9) of the scanner such as the window 96 of FIG. 7. Specific locations of the mirror M1 along the Z axis may be stored in the memory 166 in correspondence with specific orientations of the beam 26 so that operation of the scan controller 164 in control of the Z-axis position is accomplished in the same fashion as the selection of the rotational positions of the mirrors M1 and M2.

In the operation of the scanner 20F of FIG. 9, the M2 mirror controller 126 activates the mirror 122 to rotate the housing 116 about the base 114. Rotation of the housing 116 carries the side chamber 150 through a circular arc centered in the Z axis. The movement of the side chamber 150 of the housing 116 along the circular arc carries the wedge mirror M2 in a circular path about the Z axis, thereby to direct light upon the mirror M1, or to receive light from the mirror M1, at a desired angle B2 (the angle B2 of the swept leg 82 of the optical path being identified in FIG. 2). The rotation of the housing 116 also carries the relay mirror R2 and the two lenses L1 and L2 through the same circular arc as the mirror M2 and, furthermore, rotates the mirror R1 through the same angle B2 about the Z axis as is provided for the wedge mirror M2.

For rotation of the M1 mirror about the Z axis, the M1 motor controller 36 activates the motor 134 to rotate the turntable 128 relative to the housing 116. A rotation of the turntable 128 at a rotational rate equal and opposite to that of the rotational rate of the housing 116 provides for a stationary orientation of the mirror M1. Thus, in order to rotate the mirror M1 to a desired angle B1 (the angle B1 is shown in FIG. 2) the scan controller 164 must subtract the rotational angle of the housing 116 from the desired rotational position of the mirror M1, this giving a differential angle which is applied by the scan controller 164 to the M1 motor controller 136. Operation of the motorized drive 158 for the Z-axis positioning of the mirror M1 may be accomplished concurrently with the activation of the motors 122 and 134, if desired, by directing the Z motor controller 162 to apply drive signals to the motor of the motorized drive 158. The physical structure of the housing 116 including its side chamber 150 may be employed also in the positioning of the optical elements R1, R2, and M2 in the optical systems disclosed in FIGS. 5-8.

The embodiment shown in FIG. 7 may be accomplished by first rotating and then translating mirror M1 as embodied in FIG. 9 or first translating and then rotating M1.

In the first embodiment of FIG. 9, the M1 mirror translation mechanism 150, 158, 160 is disposed within the cylindrical turntable 128 rotated by M1 motor 139 relative to recess 132. In the second embodiment (not shown) a cylindrical housing similar to 128 is first translated along the z axis relative to recess 132 by a linear drive mechanism including linear position feedback and then the M1 mirror is rotated relative to the translating housing by a similar rotation mechanism comprising motor 134, bearings 130 and angular position sensor 170.

The scanner 20, as well as its various alternative embodiments 20A-F, provide the advantage over prior-art scanners in that the optical beam can be directed over a large field of regard (FOR) without the need for mechanical pointing apparatus employing gimbals and without the need for refractive wedge scanning elements which disadvantageously may introduce nonlinearities in pointing, and image distortion. The avoidance of the refractive wedge scanning elements in the construction of the scanner 20 and 20A-F provides a further advantage of avoidance of the sensitivity to index of refraction and wavelength of the radiation inherent in the use of refractive scanning wedges.

An additional advantage over gimballed scanning mechanism is that only the translation of a single mirror mechanism is required to achieve the smallest fixed exit window instead of having to translate or tilt the entire sensor and pointing mechanism in several axes simultaneously.

In the scanner 20, the conical FOR has a maximum cone angle equal to four times the wedge angle of the M1 mirror in the situation wherein the M1 and the M2 mirrors have equal wedge angle. Also, the system line-of-sight (LOS) pointing is linear, non-rotational, and achromatic, as well as being insensitive to variations in temperature. The image stays erect, relative to the sensor coordinate reference axes (shown in FIG. 2) for any point in the FOR. The rotational inertia of the rotating components in each of the embodiments of the scanner 20 can be matched so as to eliminate mechanical reaction over a period of the scan of the subject. The scanner is capable of providing an FOR having hemispherical coverage.

The wedge mirror rotation angle solutions for raster pattern generation are linear for the scanner 20, and are given by the following relationships for elevation angle (EL) and azimuth angle (AZ), as follows:

$$EL = 2A[\cos(B2) + \cos(B1)]$$

$$AZ = 2A[\sin(B2) + \sin(B1)]$$

Wherein $A = A1 = A2$ for equality of the wedge angles of the mirrors M1 and M2. In the optical system depicted in FIG. 1, the wedge angles for both the M1 mirror and the M2 mirror are equal to 15° giving a circular FOR of 60°.

In the case of the scanner 20A of FIG. 4, the foregoing relationships for the elevation and azimuth angles in terms of mirror wedge angle are altered to read as follows.

$$EL = -2A[\cos(B2) - \cos(B1)]$$

$$AZ = -2A[\sin(B2) - \sin(B1)]$$

The foregoing relationship applies also to the optical systems of FIGS. 5-9. Also, the LOS half cone angle for the FOR is given by four times the wedge angle of either of the mirrors M1 and M2 wherein the two wedge angles of these mirrors are equal.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A scanner for directing a beam of radiation along an optical path between a fixed point and a subject, the scanner providing for generating a scanning pattern of the beam along the subject, the scanner comprising:
   a first wedge mirror and a second wedge mirror having respectively a first planar reflecting surface and a second reflecting surface disposed along said optical path and being positioned relative to each other for directing the beam from one of said reflecting surfaces to the other of said reflecting surfaces;
   first rotation means for rotating said first wedge mirror about said first axis of rotation; and
   second rotation means for rotating said second wedge mirror about a second axis of rotation, said first and said second reflecting surfaces being inclined respectively about said first and said second rotational axes by first and second wedge angles, respectively.

2. A scanner according to claim 1 wherein said first axis of rotation coincides with the second axis of rotation, said first wedge angle equals said second wedge angle, and said fixed point is a detector of radiation or a source of radiation.

3. A scanner according to claim 1 wherein said first wedge mirror has the form of an annulus defining a central bore disposed on said first axis of rotation, said optical path passing via said central bore between said fixed point and said second wedge mirror.

4. A scanner according to claim 3 further comprising a lens of positive power disposed on said optical path between said fixed point and said second wedge mirror.

5. A scanner according to claim 4 further comprising an annular support having a central passage, said optical path passing via said central passage between said fixed point and said second wedge mirror, said first wedge mirror being held rotatably by said support, said first and said second rotation means being held by said support, said scanner further comprising a frame element connecting said second wedge mirror to said second rotation means and positioning said second wedge mirror on said optical path, and wherein said lens of positive power is a collimating lens.

6. A scanner according to claim 5 wherein said first axis of rotation coincides with said second axis of rotation, and said first wedge angle equals said second wedge angle.

7. A scanner according to claim 3 wherein said second reflecting surface is offset from said first axis of rotation, and said scanner further comprises relay means having a relay mirror disposed on said first axis of rotation and positioned in front of said first reflecting surface for folding said optical path at a location between said fixed point and said second wedge mirror.

8. A scanner according to claim 1 wherein said second reflecting surface is offset from said first axis of rotation, and said scanner further comprises relay means having a first relay mirror disposed on said first axis of rotation for folding said optical path to bypass said first wedge mirror between said fixed point and said second wedge mirror.

9. A scanner according to claim 8 wherein said relay means includes a second relay mirror disposed along said optical path between said first relay mirror and said second wedge mirror.

10. A scanner according to claim 9 wherein, in a set of mirrors consisting of said first relay mirror and said second relay mirror and said second wedge mirror, each of two of said mirrors has a curved reflecting surface for focusing the beam of radiation.

11. A scanner according to claim 9 wherein each of said relay mirrors and said second wedge mirror has a planar reflecting surface, and said relay means further comprises a lens system disposed between said second relay mirror and said second wedge mirror for focusing the beam of radiation.

12. A scanner according to claim 8 wherein said optical path impinges upon said first reflecting surface of said first wedge mirror at a first reflection point, said scanner further comprises means for displacing said first wedge mirror along said first rotational axis resulting in a changing of spacing between said first wedge mirror and said second wedge mirror, and an increase of said spacing between said wedge mirrors allows for a displacing of said first reflection point closer to said first rotational axis for a reduction in required size of an output window for said scanner.

13. A scanner according to claim 1 wherein said optical path impinges upon said first reflecting surface of said first wedge mirror at a first reflection point, said scanner further comprises means for displacing said first wedge mirror along said first rotational axis resulting in a changing of spacing between said first wedge mirror and said second wedge mirror, and an increase of said spacing between said wedge mirrors allows for a displacing of said first reflection point closer to said first rotational axis for a reduction in required size of an output window for said scanner.

14. A scanner according to claim 1 further comprising means operatively coupled to said first and second rotation means for selecting a rotational position of said first wedge mirror and a rotational position of said second wedge mirror which correspond to a beam position in said scanning pattern.

* * * * *